Patented Feb. 13, 1923.

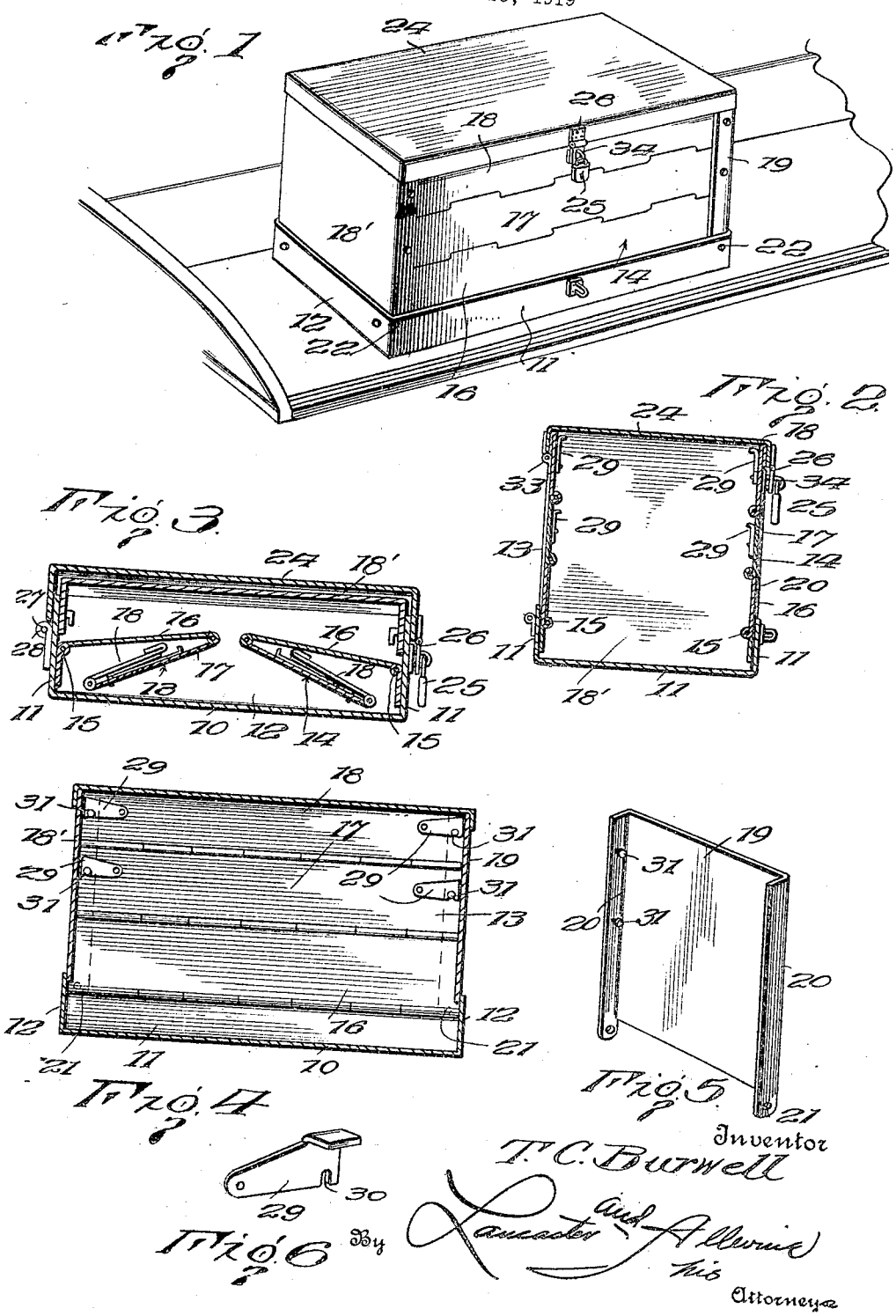

1,445,292

UNITED STATES PATENT OFFICE.

THEODORE C. BURWELL, OF BAYONNE, NEW JERSEY.

PARCEL CARRIER FOR VEHICLES.

Application filed October 25, 1919. Serial No. 333,144.

*To all whom it may concern:*

Be it known that I, THEODORE C. BURWELL, a citizen of the United States, residing at Bayonne, in the county of Hudson and State of New Jersey, have invented certain new and useful Improvements in Parcel Carriers for Vehicles, of which the following is a specification.

This invention relates to a parcel carrier particularly designed for use upon vehicles, and more particularly for use upon automobiles, for carrying various types of parcels, and an object of the invention is to provide a parcel carrier which may be attached to the running board of an automobile, or at any other convenient location thereon, and one which may be collapsed to occupy a relatively small space, when not in use, and expanded or opened out for use in carrying parcels.

Another object of this invention is to provide a collapsible parcel carrier as specified, which includes a bottom or main body portion comprising a bottom and relatively low side formed rigidly therewith, to which relatively low side collapsible side plates are hingedly connected, said collapsible side plates comprising a plurality of sections hingedly connected and adapted to be folded to lie within the portion enclosed by the relatively low permanent side and end portions, and further to provide end portions having right angularly extending flanges upon each edge thereof, which fold over the collapsed foldable side portions when the latter are collapsed, and also rest within the enclosure encompassed by the rigid side and end portions.

A further object of the invention is to provide a cover for the carrier which is hingedly connected to one of the rigid side portions of the carrier in such manner that it may be easily disconnected therefrom and connected to the outer surface of one of the foldable side sections, adjacent the upper edge thereof for serving as a cover for the parcel carrier when in an opened or extended position.

A still further object of the invention is to provide means for locking the foldable side and end sections in their extended positions.

Other objects of the invention will appear in the following detailed description taken in connection with the accompanying drawing, forming a part of this specification and in which drawing:

Figure 1 is a perspective view of the improved parcel carrier showing it in an opened position and applied to a vehicle.

Figure 2 is a vertical cross section through the parcel carrier in an opened position.

Figure 3 is a cross section through the parcel carrier in a collapsed position.

Figure 4 is a longitudinal section through the parcel carrier in an opened position.

Figure 5 is a detail perspective view of one of the hinged end sections of the collapsible parcel carrier, and Figure 6 is a detail perspective view of a catch employed in supporting the foldable end and side sections in extended positions.

Referring more particularly to the drawings, wherein like characters indicate like and corresponding parts throughout the several views, the parcel carrier comprises the bottom 10 which has upstanding sides 11, and ends 12 formed integrally therewith. These sides and ends are relatively low, and the sides 11 have collapsible sides 13 and 14 hingedly connected thereto as shown at 15. Each of these sides 13 and 14 is composed of a plurality of longitudinally extending strips 16, 17 and 18, which are hingedly connected one to the other, while the innermost strips 16 are hingedly connected at 15 to the inner surfaces of the upstanding rigid side 11.

Collapsible ends 18', and 19 are provided, which have their edge portions bent to form right angularly disposed longitudinally extending flanges 20 projecting beyond the lower edges of the end plate to form ears 21, by means of which these end plates are pivotally connected to the inner surface of the rigid sides 11, near their ends, as indicated at 22. When the parcel carrier is collapsed, as indicated in Figure 3 of the drawings, the foldable or collapsible sides 13 and 14 are folded within the body formed by the bottom 10, upstanding sides 11 and ends 12, while the collapsible ends 19 and 18' are folded downwardly over the collapsed sides, and the cover 24 is then folded over the ends 18' and 19 and fastened in any suitable manner, such as by means of a padlock indicated at 25 and a hasp 26. The cover 24 is hingedly connected by means of hinge pins 27 to one of the sides 11 when the parcel carrier is in its collapsed or folded position and these hinge pins are slidable in barrels 28, so that when it is desired to open out the parcel carrier as shown in Figures 1, 2 and 4 of the drawings the cover 24 is opened and moved longitudinally to slip the pins 27 out of the barrels 28 after which the ends 18' and 19 are moved vertically and the sides 13 and 14 are unfolded. The upper sections 17 and 18 of the sides 13 and 14 carry catches 29 which are pivotally connected thereto, and are provided with notches 30 which engage over pins 31, carried by the angled edges 20 of the ends 18' and 19, which pins extend through suitable openings formed in the sections 17 and 18 of the sides 13 and 14, thereby securely connecting the ends 18' and 19 and the sides 13 and 14 in their extended positions. After the end and sides are connected, in their unfolded opened positions, the cover 24 is hingedly connected to the upper section 18 of the sides 13, by slipping the hinge pins 27 into the hinged barrels 33, which are carried by the upper section 18 of the sides 13 at the outer surface thereof. The upper section 18 of the foldable sides 14 has a staple 34 carried thereby which is adapted to co-act with the hasp 26 and lock 25 for locking the cover 24 upon the opened parcel carrier.

Changes in details may be made without departing from the spirit of this invention, but;

I claim:

1. In a parcel carrier, the combination of a bottom, relatively short rigid sides and ends formed upon said bottom, collapsible ends and sides hingedly connected to said rigid sides, said collapsible ends comprising end plates having their edges bent at right angles thereto, said angled edges projecting below the lower end of the end plate and pivotally connected to said rigid sides, said collapsible sides comprising a plurality of longitudinally extending hingedly connected sections, certain of said sections provided with openings adjacent their ends, pins carried by the angled edges of said collapsible end plates and adapted for extending through said openings to connect the collapsible sides and ends when extended, and catches pivotally carried by said collapsible sides for engagement with said pins to prevent accidental disconnection of the collapsible sides and ends when extended.

2. In a parcel carrier, the combination of a bottom, relatively short rigid sides and ends formed upon said bottom, collapsible ends and sides hingedly connected to said rigid sides, said collapsible ends comprising end plates having their edges bent at right angles thereto, said angled edges projecting below the lower end of the end plate and pivotally connected to said rigid sides, said collapsible sides comprising a plurality of longitudinally extending hingedly connected sections, certain of said sections provided with openings adjacent their ends, pins carried by the angled edges of said collapsible end plates and adapted for extending through said openings to connect the collapsible sides and ends when extended, and catches pivotally carried by said collapsible sides for engagement with said pins to prevent accidental disconnection of the collapsible sides and ends when extended, a cover detachably and hingedly connected to one of said rigid sides and said cover adapted to be detachably and hingedly connected to one of said collapsible sides when extended to form a cover for the extended parcel carrier.

THEODORE C. BURWELL.